(12) United States Patent
Moon et al.

(10) Patent No.: US 10,953,773 B2
(45) Date of Patent: Mar. 23, 2021

(54) FOLD AND DIVE SEAT FOR VEHICLE

(71) Applicants: HYUNDAI MOTOR COMPANY, Seoul (KR); KIA MOTORS CORPORATION, Seoul (KR); DAECHANG SEAT CO., LTD-DONGTAN, Hwaseong-si (KR); HYUNDAI TRANSYS INC., Seosan-si (KR)

(72) Inventors: Hyun Kyu Moon, Hwaseong-si (KR); Seon Chae Na, Yongin-si (KR); Jung Sang You, Hwaseong-si (KR); Chan Ho Jung, Gunpo-si (KR); Sang Beom Hwang, Seoul (KR); In Chang Hwang, Hwaseong-si (KR); Myung Soo Lee, Osan-si (KR); Jeong Soo Kim, Busan (KR); Eom Seok Yoo, Hwaseong-si (KR)

(73) Assignees: HYUNDAI MOTOR COMPANY, Seoul (KR); KIA MOTORS CORPORATION, Seoul (KR); DAECHANG SEAT CO., LTD-DONGTAN, Hwaseong-si (KR); HYUNDAI TRANSYS INC., Seosan-si (KR)

( * ) Notice: Subject to any disclaimer, the term of this patent is extended or adjusted under 35 U.S.C. 154(b) by 50 days.

(21) Appl. No.: 16/383,994

(22) Filed: Apr. 15, 2019

(65) Prior Publication Data
US 2020/0180474 A1 Jun. 11, 2020

(30) Foreign Application Priority Data
Dec. 11, 2018 (KR) .......................... 10-2018-0158781

(51) Int. Cl.
*A47C 1/00* (2006.01)
*B60N 2/20* (2006.01)
(Continued)

(52) U.S. Cl.
CPC ............ *B60N 2/203* (2013.01); *B60N 2/3011* (2013.01); *B60N 2/3065* (2013.01); *B60N 2/36* (2013.01); *B60N 2205/30* (2013.01)

(58) Field of Classification Search
CPC .. B60N 2/3013; B60N 2/3065; B60N 2/3004; B60N 2/2257; B60N 2/36; B60N 2/22;
(Continued)

(56) References Cited

U.S. PATENT DOCUMENTS 8,882,197 B2 * 11/2014 Line ..................... B60N 2/3093
297/334
9,796,302 B2 * 10/2017 Nishide ................ B60N 2/2222
(Continued)

FOREIGN PATENT DOCUMENTS

FR 2892355 A1 4/2007
FR 2961137 A1 12/2011
(Continued)

*Primary Examiner* — Chi Q Nguyen
(74) *Attorney, Agent, or Firm* — Brinks Gilson & Lione

(57) ABSTRACT

A fold and dive seat for a vehicle is provided with a seat-cushion tilting mechanism, a fold and dive mechanism, and a seatback reclining mechanism so as to simultaneously performed both a seatback reclining operation and a tilting operation of a front portion of a seat cushion. The fold and dive seat reduces by evenly dispersing a body pressure over a passenger's upper body and lower body.

14 Claims, 10 Drawing Sheets

(51) Int. Cl.
   *B60N 2/30* (2006.01)
   *B60N 2/36* (2006.01)
(58) Field of Classification Search
   CPC ...... B60N 2/309; B60N 2/3093; B60N 2/203;
      B60N 2/12; B60N 2/206; B60N 2/3011;
      B60N 2205/30
   USPC .................. 297/331, 334, 335, 13, 307, 340
   See application file for complete search history.

(56) References Cited

U.S. PATENT DOCUMENTS

| | | | | |
|---|---|---|---|---|
| 2006/0055214 | A1* | 3/2006 | Serber | B60N 2/1846 297/216.1 |
| 2009/0167068 | A1* | 7/2009 | Yamagishi | B60N 2/12 297/340 |
| 2012/0181409 | A1* | 7/2012 | Hayahara | B60P 7/0815 248/429 |
| 2014/0062158 | A1* | 3/2014 | Line | B60N 2/2356 297/378.1 |
| 2015/0203011 | A1* | 7/2015 | Fujita | B60N 2/22 297/284.11 |
| 2015/0336486 | A1* | 11/2015 | Kimura | B60N 2/36 297/340 |
| 2016/0159256 | A1 | 6/2016 | Szlag | |
| 2016/0318426 | A1* | 11/2016 | Aita | B60N 2/3075 |
| 2019/0092191 | A1* | 3/2019 | Bouzid | B60N 2/309 |

FOREIGN PATENT DOCUMENTS

| | | |
|---|---|---|
| KR | 10-0521873 B1 | 10/2005 |
| KR | 10-0534943 B1 | 12/2005 |
| KR | 10-1209993 B1 | 12/2012 |

* cited by examiner

FIG. 1A
FIG. 1B
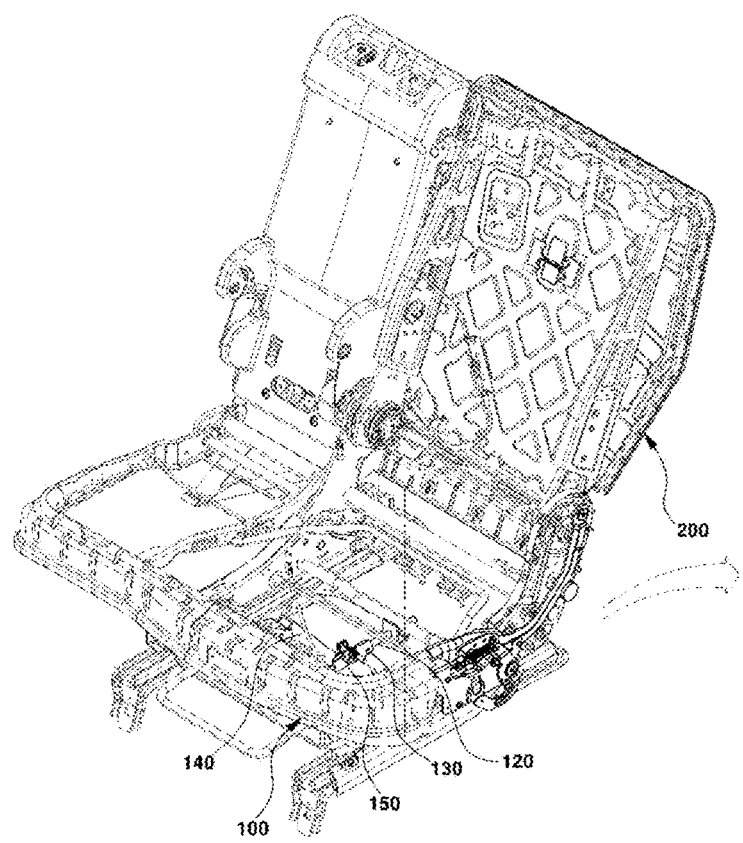
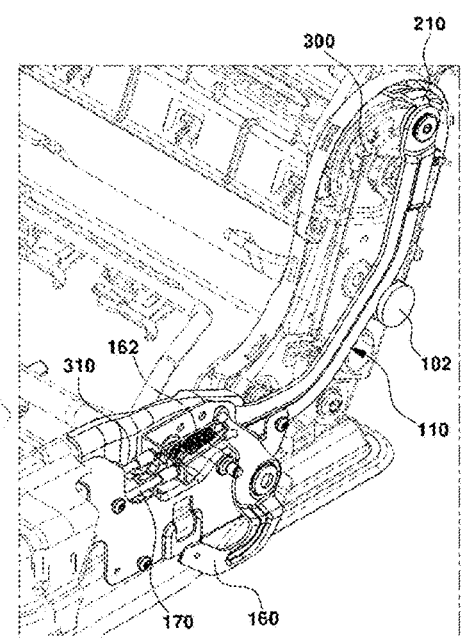

FOLD AND DIVE SEAT FOR VEHICLE

CROSS-REFERENCE TO RELATED APPLICATION

This application claims priority to and the benefit of Korean Patent Application No. 10-2018-0158781, filed on Dec. 11, 2018, the entire contents of which are incorporated herein by reference.

FIELD

The present disclosure relates to a fold and dive seat for a vehicle to provide a passenger with a comfortable position.

BACKGROUND

The statements in this section merely provide background information related to the present disclosure and may not constitute prior art.

A fold and dive seat for a vehicle refers to a seat allowing both a folding operation that folds a seatback over a seat cushion because a loading space behind the seatback is insufficient in the case of loading a long article, and a dive operation that moves a front portion of the seat cushion downwards so as to make a rear surface of the folded seatback horizontal.

A mechanism for reclining the seatback rearwards is basically applied to such a fold and dive seat so as to achieve a fatigue reducing posture for a passenger's rest and sleeping.

For reference, the term "fatigue reducing posture" means a posture capable of reducing a fatigue degree by changing the support angle of the hips, thighs, calves and others when the support angle of a passenger's upper body changes, thus allowing a body pressure to be dispersed as much as possible.

The fold and dive seat combines with the seatback reclining mechanism as well as the fold and dive mechanism, thus allowing a passenger to lean his or her upper body more rearwards when the seatback is reclined and thereby providing comfortability. However, we have discovered that as the seat cushion remains fixed, the body pressure for the passenger's hips and thighs is not dispersed and thereby the fatigue degree of the lower body undesirably increases.

The above information disclosed in this Background section is only for enhancement of understanding of the background of the disclosure and therefore it may contain information that does not form the prior art that is already known to a person of ordinary skill in the art.

SUMMARY

The present disclosure provides a fold and dive seat for a vehicle, in which a seat-cushion tilting mechanism is added to the fold and dive seat equipped with a fold and dive mechanism and a seatback reclining mechanism, thus allowing both a seatback reclining operation and a tilting operation for moving a front portion of a seat cushion upwards to be simultaneously performed, and consequently realizing a fatigue reducing posture with which a body pressure is evenly dispersed for a passenger's upper body and lower body.

In one aspect, the present disclosure provides a fold and dive seat for a vehicle including: a seat cushion frame; a seatback frame reclinably mounted to the seat cushion frame; a tilting and dive link including a front end fixed to the seat cushion frame, and a rear end hinged to the seatback frame; a link supporter formed on a rear end of the seat cushion frame to support a rear surface of the tilting and dive link; a rail pipe mounted to a lower portion of the seat cushion frame; a slider mounted on the rail pipe and configured to be slidable forwards and rearwards; and a tilting support link hinged between a front end of the slider and a front end of the seat cushion frame.

In one form, the fold and dive seat may further include: a lever mounted to a side of the seat cushion frame to be tiltable; a linear locking device mounted on the slider and configured to lock or unlock the slider to or from the rail pipe; and a cable connected between the lever and the linear locking device. In particular, the cable may be pulled and thereby the linear locking device may be unlocked when the lever may be tilted, and the cable may move to an original position thereof and thereby the linear locking device may be locked when the lever may be released.

In another form, the linear locking device may include: an elastic clamp forming a round pipe including an opening at one side of the elastic clamp, where the elastic clamp is positioned between an outer circumference of the rail pipe and an inner circumference of the slider; and a pulling plate integrally formed in an end of the elastic clamp and extended to an outer circumference of the slider. In particular, an inner end of the cable may be coupled to the pulling plate.

In still another form, a stopper may be integrally formed on the outer circumference of the slider and configured to define a first position before the pulling plate is pulled and a second position after the pulling plate is pulled.

In yet another form, a friction plate may be provided on an inner circumference of the elastic clamp to come into contact with or move away from the rail pipe.

In still yet another form, the front end of the tilting and dive link may be fixed to the seat cushion frame by welding, and the rear end of the tilting and dive link may be hinged to a hinge bracket mounted on the seatback frame.

In a further form, a reclining cable connected with a reclining device may be connected to the lever to be pulled together.

In another aspect, the present disclosure provides a fold and dive seat for a vehicle including: a seat cushion frame; a seatback frame reclinably mounted to the seat cushion frame; a tilting and dive link including a front end fixed to the seat cushion frame, and a rear end hinged to the seatback frame; a link supporter formed on a rear end of the seat cushion frame to support a rear surface of the tilting and dive link; a rail pipe mounted to a lower portion of the seat cushion frame; a slider mounted on the rail pipe and configured to be slidable forwards and rearwards; and a tilting support link hinged between a front end of the slider and a front end of the seat cushion frame, wherein a slot may be formed on the tilting and dive link to guide a movement trajectory, and a guide pin may be formed on a side of the seat cushion frame to be inserted into the slot.

Other aspects of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

DRAWINGS

In order that the disclosure may be well understood, there will now be described various forms thereof, given by way of example, reference being made to the accompanying drawings, in which:

FIGS. 1A and 1B are perspective views illustrating a fold and dive seat for a vehicle in one form of the present disclosure;

Figure 2:
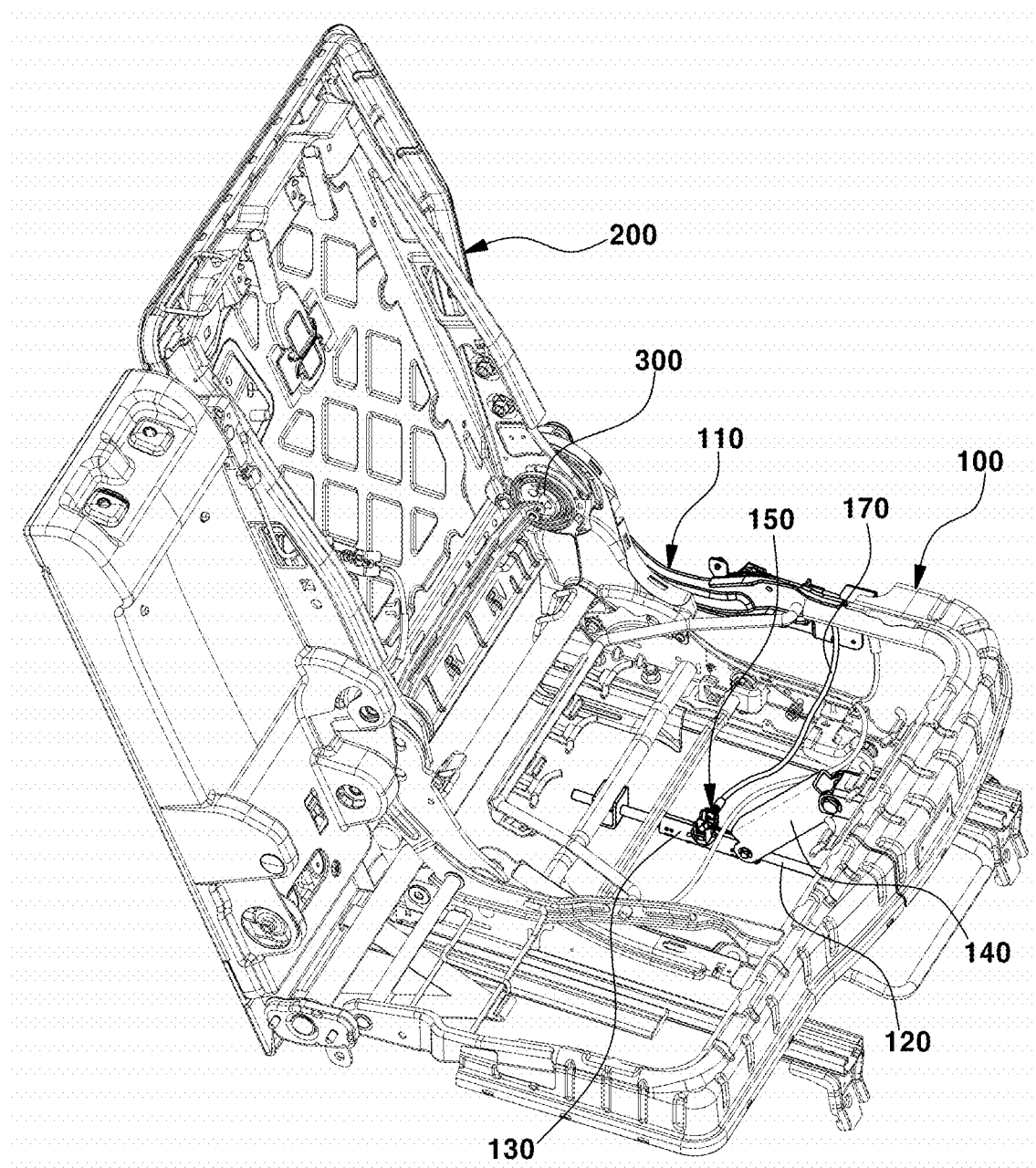
FIG. 2 is a perspective view illustrating a fold and dive seat for a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

While the disclosure will be described in conjunction with exemplary forms, it will be understood that present description is not intended to limit the disclosure to those exemplary forms. On the contrary, the disclosure is intended to cover not only the exemplary forms, but also various alternatives, modifications, equivalents and other forms, which may be included within the spirit and scope of the disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

FIGS. 1A and 1B, and FIG. 2 are perspective views illustrating a fold and dive seat for a vehicle in one form of the present disclosure. In the drawings, reference numeral 100 denotes a seat cushion frame and reference numeral 200 denotes a seatback frame.

The seatback frame 200 is reclinably connected to the seat cushion frame 100.

That is, a reclining device 300 is mounted to a junction between a rear end of the seat cushion frame 100 and a lower end of the seatback frame 200 to adjust a rear inclination angle of the seatback frame 200.

According to one form of the present disclosure, a tilting and dive link 110 is arranged across outer surfaces of the seat cushion frame and the seatback frame to serve as a link configuration for performing both the reclining operation of the seatback frame and the tilting operation of the seat cushion frame.

A front end of the tilting and dive link 110 is secured to the seat cushion frame 100, while a rear end thereof is hinged to the seatback frame 200.

More particularly, the front end of the tilting and dive link 110 is secured to the seat cushion frame 100 by welding, while the rear end thereof is rotatably hinged to the hinge bracket 210 mounted to the seatback frame 200.

The tilting and dive link 110 has a moving trajectory for tilting the seat cushion frame 100 when the seatback frame 200 is reclined, and a rear surface of the tilting and dive link 110 should be supported for the moving trajectory.

To this end, a link supporter 102 protrudes integrally from an outer surface of the rear end of the seat cushion frame 100 to support the rear surface of the tilting and dive link 110.

Furthermore, as another configuration for tilting the seat cushion frame 100 when the seatback frame 200 is reclined, a rail pipe 120 is mounted to a lower portion of the seat cushion frame 100 to be arranged in a direction from front to rear, and a slider 130 is mounted to an outer circumference of the rail pipe 120 to be slidable forwards and rearwards.

A tilting support link 140 is rotatably hinged between the front end of the slider 130 and a lower surface of the front end of the seat cushion frame 100 to be vertically set up or horizontally laid.

That is, the front end of the tilting support link 140 is rotatably hinged to the lower surface of the front end of the seat cushion frame 100, while the rear end thereof is rotatably hinged to the front end of the slider 130.

Referring to FIG. 2, a linear locking device 150 is mounted on the slider 130 to lock the slider 130 and thereby prevent the slider 130 from moving along the rail pipe 120, or to unlock the slider 130 and thereby allow the slider 130 to move along the rail pipe 120.

Furthermore, a lever 160 is tiltably mounted to a side of the seat cushion frame 200 to lock or unlock the linear locking device 150. A cable 170 is connected between the lever 160 and the linear locking device 150 to transmit a tilting force of the lever 160 to the linear locking device 150.

Thus, when the lever 160 is tilted and the cable 170 is pulled, the slider 130 of the linear locking device 150 is unlocked. In contrast, when the lever 160 is released and the cable 170 moves from a pulled position to an original position, the slider 130 of the linear locking device 150 is locked.

Here, the configuration of the linear locking device 150 will be described in more detail.

Figure 3A:
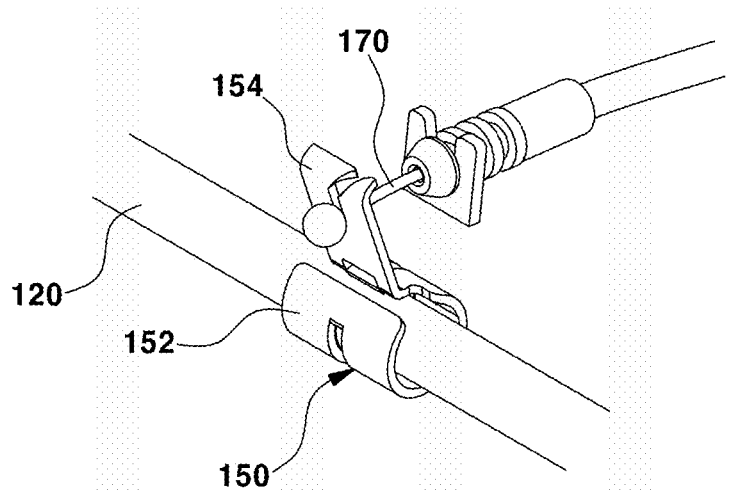
FIGS. 3A and 3B are perspective views illustrating a linear locking device of the fold and dive seat for the vehicle in one form of the present disclosure.
Figure 3B:
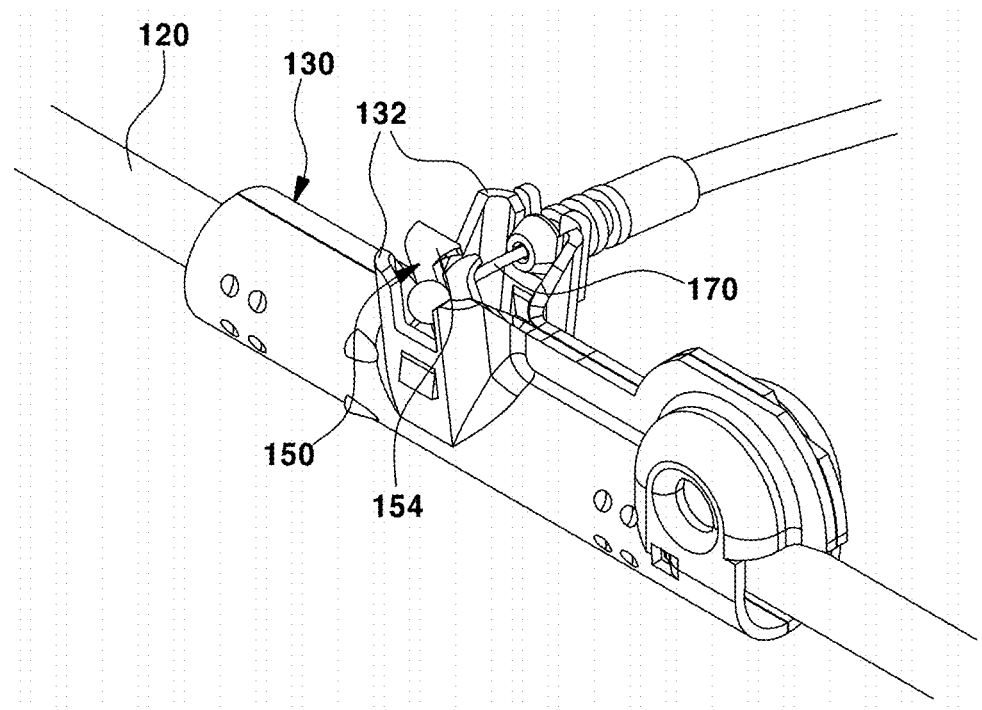
Figure 4A:
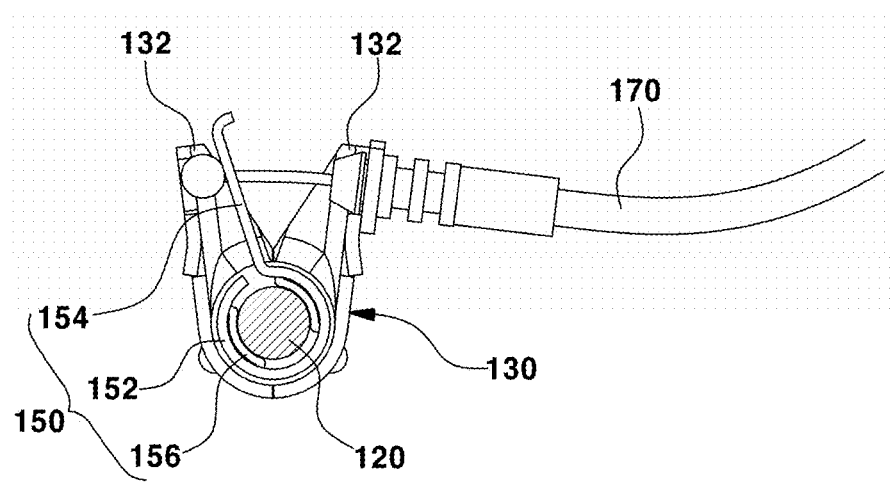
FIGS. 4A and 4B are perspective views illustrating an operation of the linear locking device of the fold and dive seat for the vehicle in one form of the present disclosure.
Figure 4B:
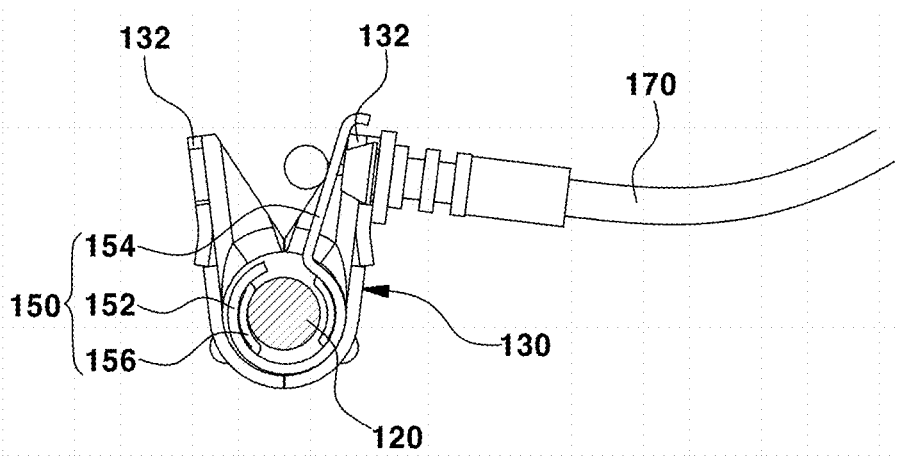

FIGS. 3A and 3B are perspective views illustrating a linear locking device of the fold and dive seat for the vehicle in one form of the present disclosure, and FIGS. 4A and 4B are perspective views illustrating an operation of the linear locking device.

The linear locking device 150 includes: an elastic clamp 152 having the structure of a round pipe including an opening at one side thereof in the form of a slit and positioned between an outer circumference of the rail pipe 120 and an inner circumference of the slider; and a flat-plate-shaped pulling plate 154 integrally formed in an end of the elastic clamp 152 to extend to an outer circumference of the slider 130.

If the elastic clamp 152 is opened and its diameter increases, the inner circumference of the elastic clamp 152 is spaced apart from the outer circumference of the rail pipe 120, thus unlocking the slider 130. As a result, the slider 130 may be movable along the rail pipe 120 together with the elastic clamp 152.

On the contrary, if the elastic clamp 152 returns to its original diameter by an elastic restoring force, the inner circumference of the elastic clamp 152 comes into close contact with the outer circumference of the rail pipe 120, thus locking the slider 130. As a result, the slider 130 may not be movable along the rail pipe 120.

In another form, a friction plate 156 may be provided on the inner circumference of the elastic clamp 152 to come into close contact with or move away from the outer circumference of the rail pipe 120. This friction plate 156 serves to inhibit or prevent the elastic clamp 152 from slipping when the inner circumference of the elastic clamp 152 comes into close contact with the outer circumference of the rail pipe 120, in addition to providing a strong fixing force to the elastic clamp 152.

In this regard, an inner end of the cable 170 is coupled to a leading end of the pulling plate 154 that protrudes through the outer circumference of the slider 130, and an outer end of the cable 170 is connected to the lever 160, as described above.

A pair of stoppers 132 may be integrally formed on the outer circumference of the slider 130 in a "V" shape to define a position of the pulling plate 154 before it is pulled and also another position of the pulling plate 154 after it is pulled.

As illustrated in FIGS. 1A and 1B, a spring 162 is connected between a leading end of the lever 160 and a predetermined position of the seat cushion frame 100 to provide an elastic restoring force after the lever 160 is tilted.

Furthermore, a reclining cable 310 connected with the reclining device 300 is connected to the leading end of the lever 160 to be pulled together, so that the cable 170 as well as the reclining cable 310 is pulled when the lever 160 is tilted.

Here, the fold and dive seat according to exemplary forms of the present disclosure as described above will be operated as follows.

Seatback Reclining and Seat Cushion Tilting Operation

Figure 5:
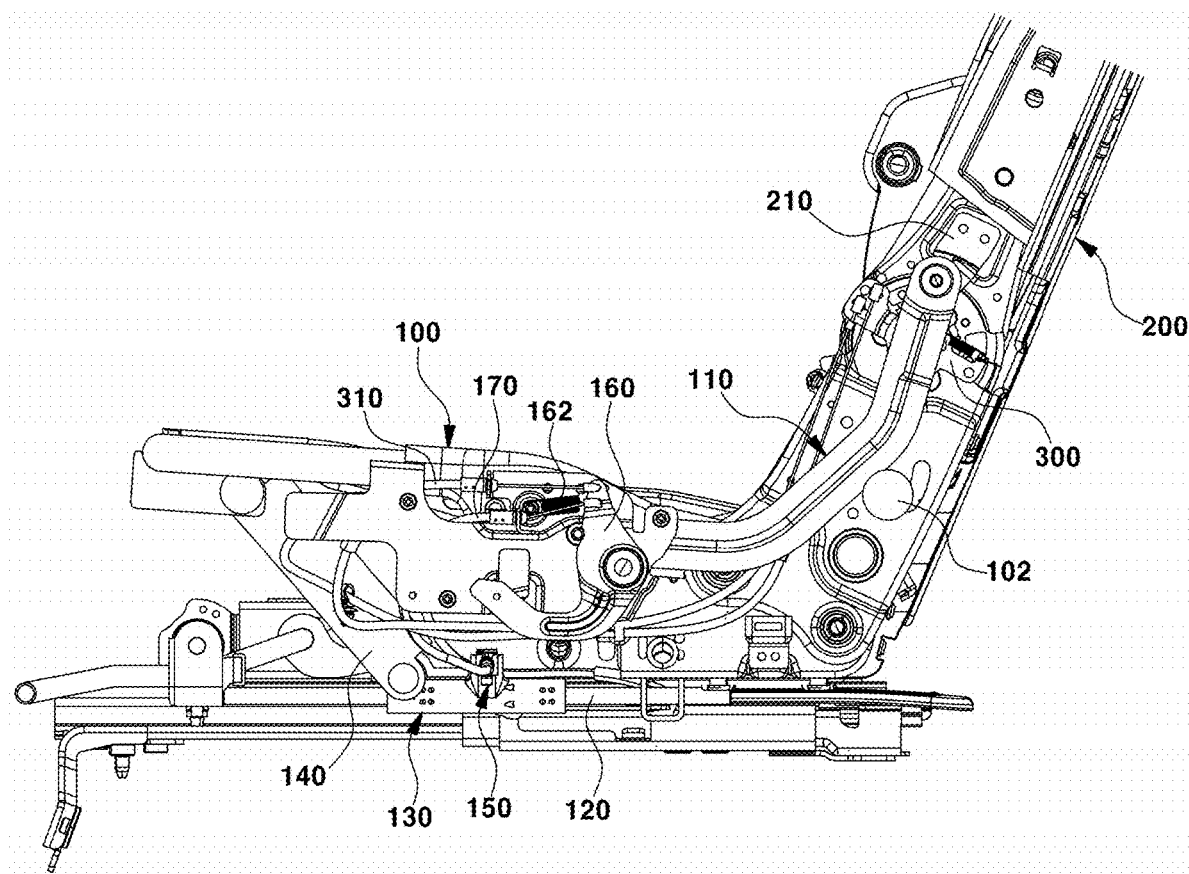
FIG. 5 is a side view illustrating a basic seating position of the fold and dive seat for the vehicle in one form of the present disclosure.
Figure 6:
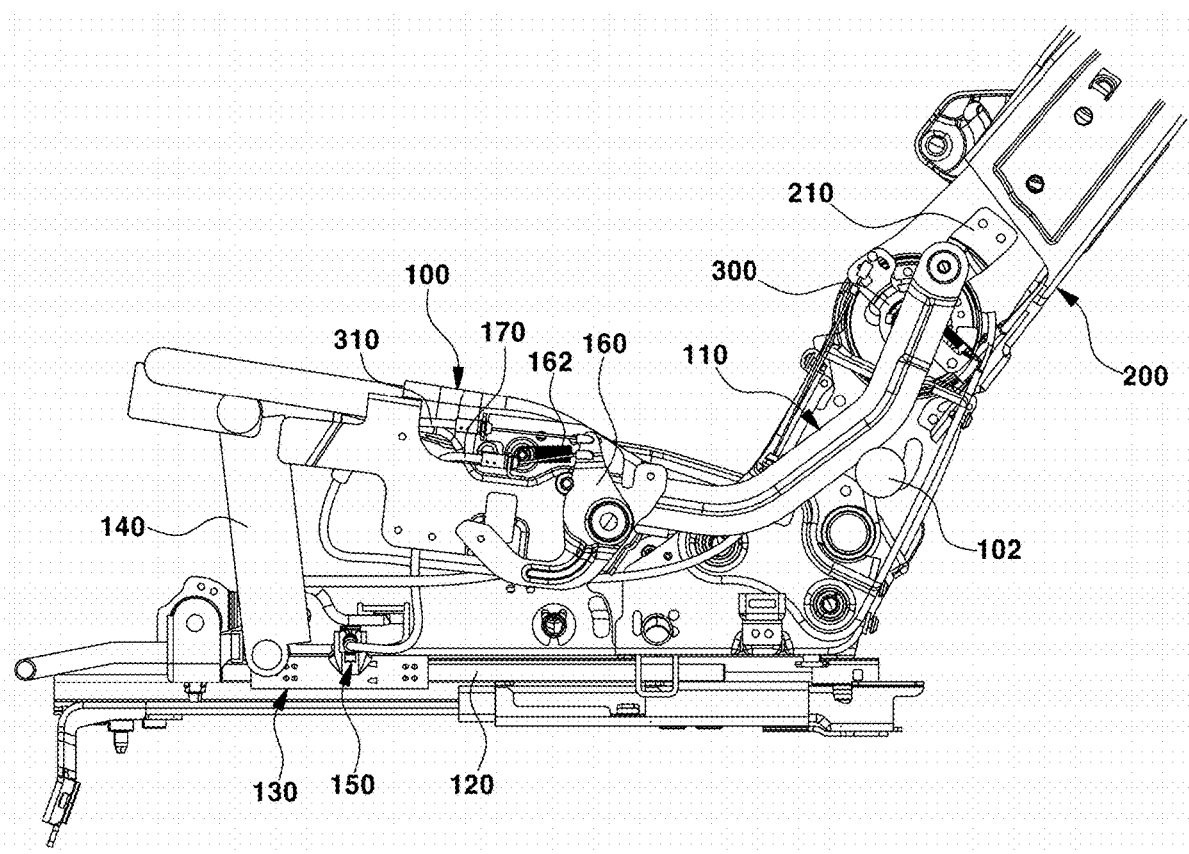
FIG. 6 is a side view illustrating a state in which a seatback is reclined and a seat cushion is tilted in the fold and dive seat for the vehicle in one form of the present disclosure.

FIG. 5 is a side view illustrating a basic seating position of the fold and dive seat for the vehicle in one form of the present disclosure, and FIG. 6 is a side view illustrating a state in which the seatback is reclined and the seat cushion is tilted.

First, if a passenger tilts the lever 160, the cable 170 and the reclining cable 310 are simultaneously pulled.

Subsequently, as the cable 170 is pulled, the pulling plate 154 of the linear locking device 150 is pulled, so that the pulling plate 154 moves from a position of FIG. 4A before it is pulled to a position of FIG. 4B after it is pulled.

Simultaneously, the elastic clamp 152 integrated with the pulling plate 154 is opened and its diameter increases. Thus, as shown in FIG. 4B, the inner circumference of the elastic clamp 152 is spaced apart from the outer circumference of the rail pipe 120.

Hence, the slider 130 is unlocked, so that the slider 130 may be movable along the rail pipe 120 together with the elastic clamp 152.

More particularly, the linear locking device 150 including the elastic clamp 152 and the pulling plate 154 is movable along the rail pipe 120, and the slider 130 surrounding the elastic clamp 152 is also movable along the rail pipe 120.

When the lever 160 is tilted, the reclining cable 310 is also pulled, so that the known reclining device 300 is also unlocked. Consequently, a reclining state in which the seatback frame 200 is inclined rearwards is realized.

In such a state, if the passenger presses the seatback with his or her back being reclined against the seatback, as shown in FIG. 6, the seatback frame 200 is inclined rearwards by the reclining device 300, so that the reclining of the seatback is achieved.

Furthermore, as the seatback frame 200 is inclined rearwards, the hinge bracket 210 mounted on the seatback frame 200 is also movable rearwards.

In this case, since the rear end of the tilting and dive link 110 is hinged to the hinge bracket 210, the rear end of the tilting and dive link 110 is also moved to a position shift point of the hinge bracket 210.

Here, since the front end of the tilting and dive link 110 is fixed to the seat cushion frame 100 by welding, and the rear surface of the tilting and dive link 110 is supported by the link supporter 102, the front end of the tilting and dive link 110 serves to raise the front end of the seat cushion frame 100 relative to the link supporter 102 as a fulcrum, using the principle of the lever.

Hence, as shown in FIG. 6, the front end of the seat cushion frame 100 moves upwards, so that the seat cushion is tilted.

As the front end of the seat cushion frame 100 moves upwards, the tilting support link 140 is vertically set up and simultaneously the tilting support link 140 pulls the slider 130 forwards. Since the slider 130 is unlocked as such, it is movable forwards along the rail pipe 120.

In such a state, if the passenger releases the lever 160, the pulling of the cable 170 is released and the elastic clamp 152 returns to its original diameter by an elastic restoring force, so that the inner circumference of the elastic clamp 152 comes into close contact with the outer circumference of the rail pipe 120. Thereby, the slider 130 is locked, and consequently the reclining of the seatback and the tilting of the seat cushion are completed.

As such, the reclining of the seatback and the tilting of the seat cushion are simultaneously performed, so that it is possible to realize a fatigue reducing posture with which a body pressure is evenly dispersed for a passenger's upper body and lower body.

Seat-Cushion Folding and Seat-Cushion Dive Operation

Figure 7:
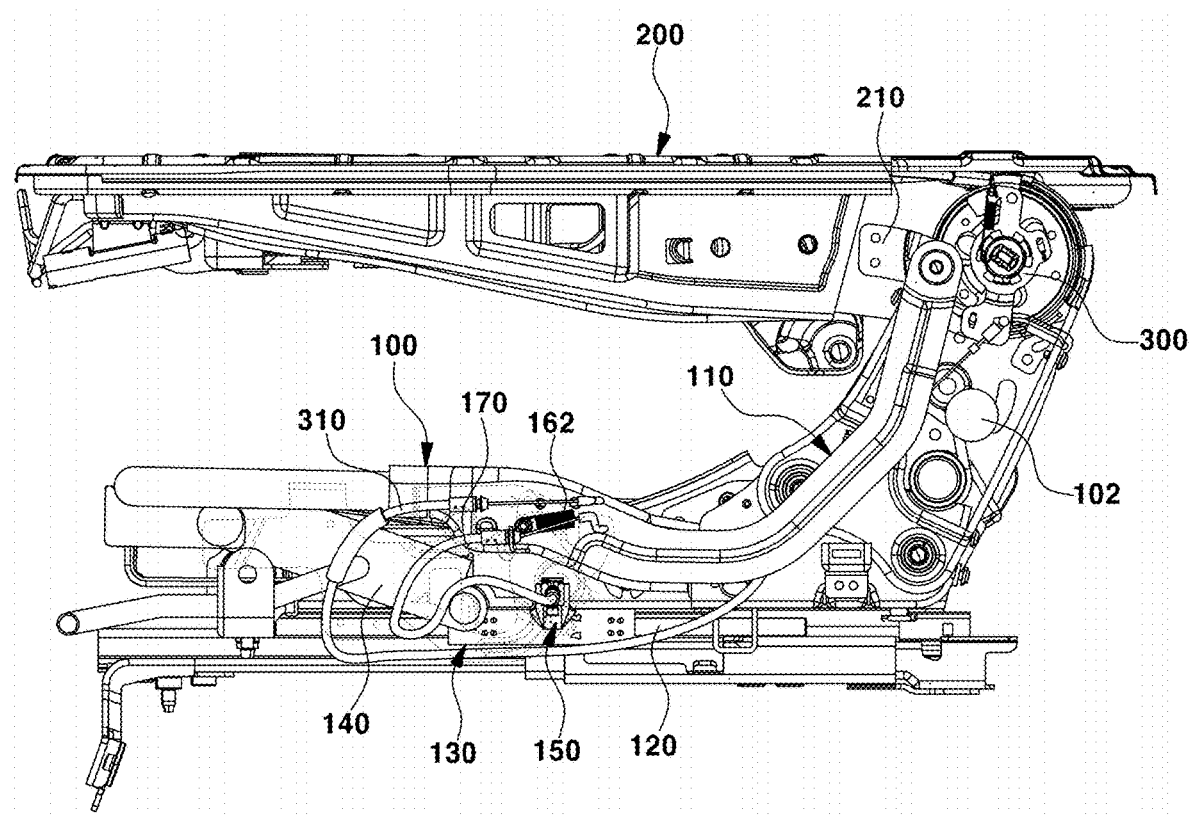
FIG. 7 is a side view illustrating a folding and dive operation of the fold and dive seat for the vehicle in one form of the present disclosure.

FIG. 7 is a side view illustrating a dive operation of the fold and dive seat for the vehicle in another form of the present disclosure.

First, if a passenger tilts the lever 160, the cable 170 and the reclining cable 310 are pulled, so that the slider 130 of the linear locking device 150 is unlocked and the reclining device 300 is unlocked.

In such a state, the folding operation in which the seatback frame 200 is forwardly rotated over the seat cushion frame 100 is performed.

As the seatback frame 200 rotates to be folded, the hinge bracket 210 mounted on the seatback frame 200 may be shifted to the front.

Moreover, since the rear end of the tilting and dive link 110 is hinged to the hinge bracket 210, the rear end of the tilting and dive link 110 is also moved to the position shift point of the hinge bracket 210.

Here, since the front end of the tilting and dive link 110 is fixed to the seat cushion frame 100 by welding, the front end of the seat cushion frame 100 is pulled downwards.

In this case, since the front end of the seat cushion frame 100 moves downwards, the tilting support link 140 is horizontally laid. Simultaneously, the tilting support link 140 pushes the slider 130 rearwards, and the slider 130 is unlocked as such, so that it is movable rearwards along the rail pipe 120. Consequently, the dive operation in which the seat cushion frame is lowered as much as possible is performed.

As such, the dive operation in which the front portion of the seat cushion becomes lower than its original position may be smoothly performed.

Figure 8:
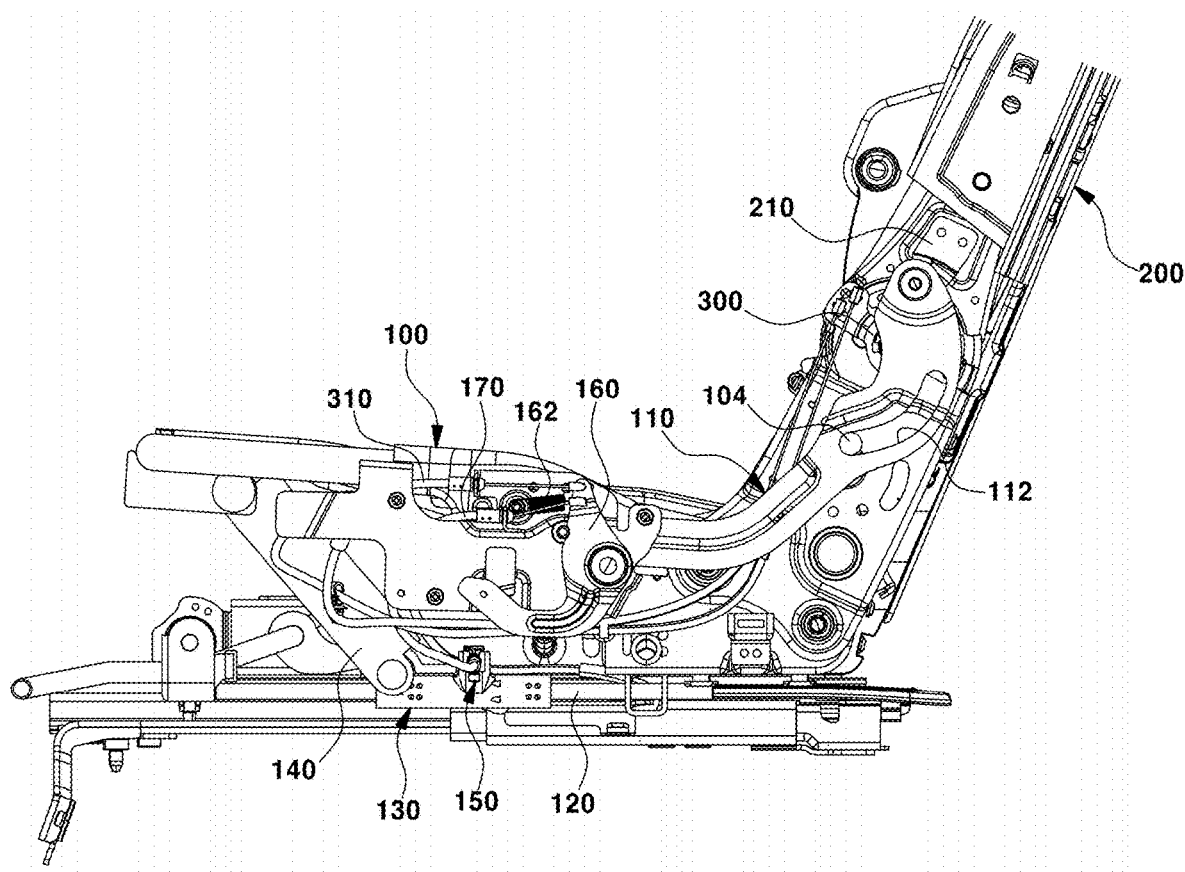
FIG. 8 is a side view illustrating a basic seating position of a fold and dive seat for a vehicle in another form of the present disclosure.
Figure 9:
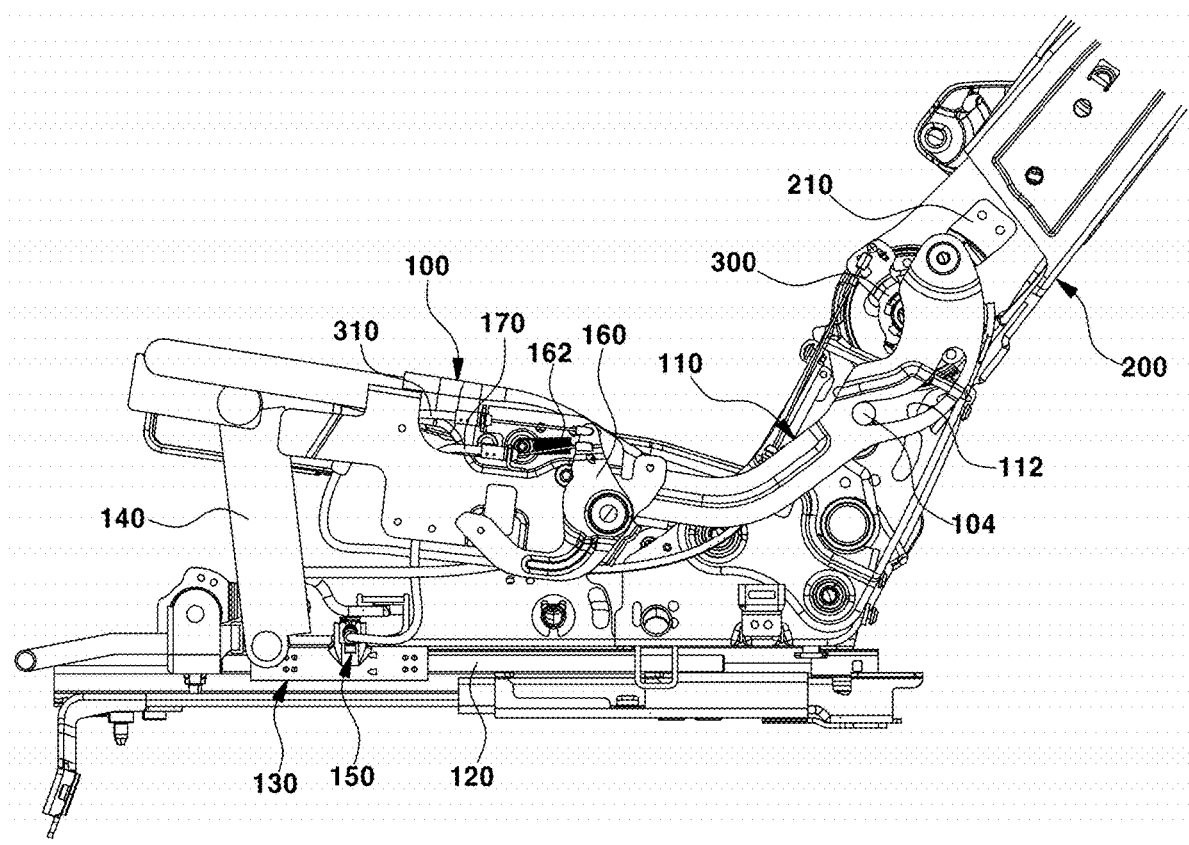
FIG. 9 is a side view illustrating a state in which a seatback is reclined and a seat cushion is tilted in the fold and dive seat for the vehicle in another form of the present disclosure.
Figure 10:
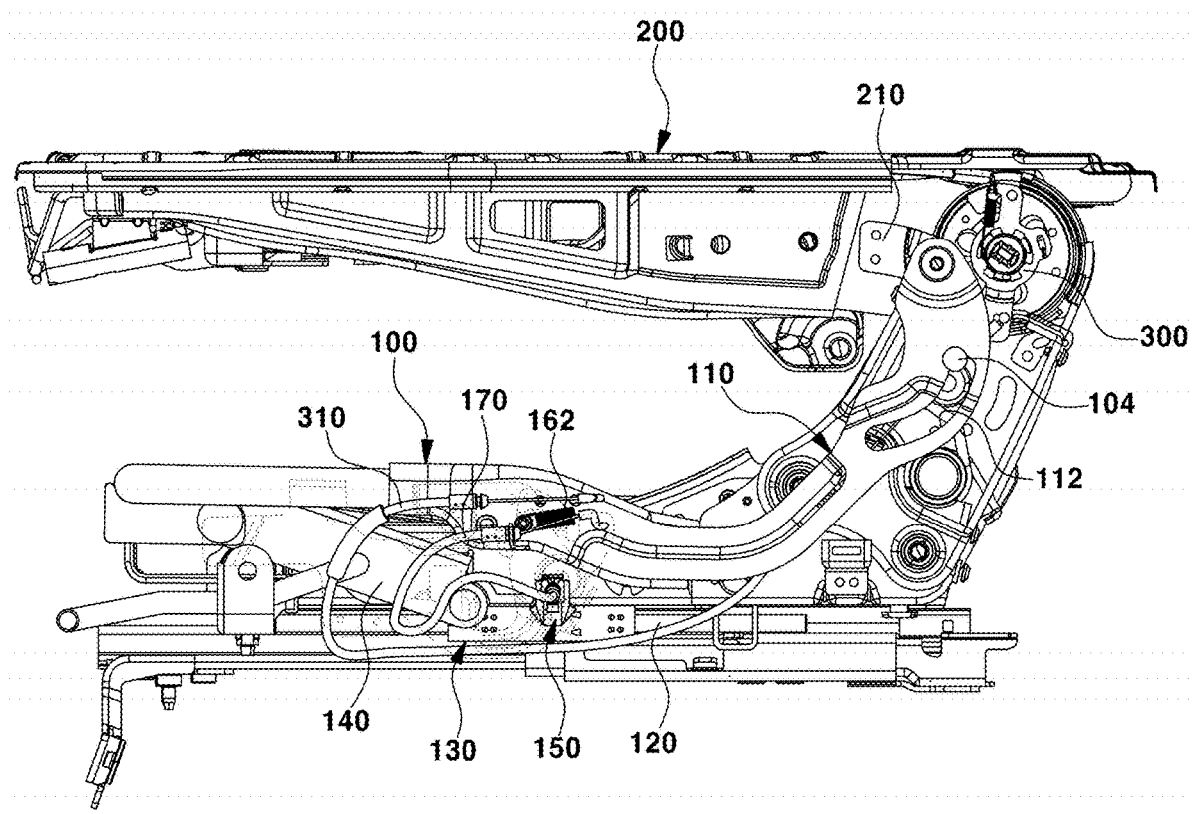
FIG. 10 is a side view illustrating a folding and dive operation of the fold and dive seat for the vehicle in another form of the present disclosure.

FIGS. 8 to 10 are side views illustrating a fold and dive seat for a vehicle according to another form of the present disclosure. FIG. 8 illustrates a basic seating position of the seat, FIG. 9 illustrates a state in which a seatback is reclined and a seat cushion is tilted, and FIG. 10 illustrates a folding and dive operation.

The configuration and operation of the fold and dive seat according to another form of the present disclosure remain the same as to the fold and dive seat according to the preceding form, but focus on stably guiding the movement trajectory of the tilting and dive link 110.

To this end, a slot 112 is formed on the tilting and dive link 110 to guide a fixed movement trajectory of the tilting and dive link 110, and a guide pin 104 is formed on a side of the seat cushion frame 110 to be inserted into the slot 112.

Therefore, as described above, a position shift trajectory of the tilting and dive link 110 when the seatback is reclined and the seat cushion is tilted, and a position shift trajectory of the tilting and dive link 110 when the seatback is folded and the seat cushion is dived may be made constant by the guiding operation of the guide pin 104 inserted into the slot 112.

As described above, the present disclosure provides the following effects.

First, a seat-cushion tilting mechanism is added to a fold and dive seat equipped with a fold and dive mechanism and a seatback reclining mechanism, thus allowing both a seatback reclining operation and a tilting operation of moving a front portion of a seat cushion upwards to be simultaneously performed, and consequently realizing a fatigue reducing posture with which a body pressure is evenly dispersed for a passenger's upper body and lower body.

Second, when a fold and dive operation is performed after a tilting operation of moving a front portion of a seat cushion upwards, a dive operation in which the front portion of the seat cushion is lower than an original position may be smoothly performed.

The disclosure has been described in detail with reference to exemplary forms thereof. However, it will be appreciated by those skilled in the art that changes may be made in these forms without departing from the principles and spirit of the disclosure.

What is claimed is:

1. A fold and dive seat for a vehicle, comprising:
   a seat cushion frame;
   a seatback frame reclinably mounted to the seat cushion frame;
   a tilting and dive link including a front end fixed to the seat cushion frame, and a rear end hinged to a hinge bracket mounted on the seatback frame;
   a link supporter formed on a rear end of the seat cushion frame to support a rear surface of the tilting and dive link;
   a rail pipe mounted to a lower portion of the seat cushion frame;
   a slider mounted on the rail pipe and configured to be slidable forwards and rearwards; and
   a tilting support link hinged between a front end of the slider and a front end of the seat cushion frame.

2. The fold and dive seat of claim 1, further comprising:
   a lever mounted to a side of the seat cushion frame to be tiltable;
   a linear locking device mounted on the slider and configured to lock or unlock the slider to or from the rail pipe; and
   a cable connected between the lever and the linear locking device,
   wherein the cable is pulled and thereby the linear locking device is unlocked when the lever is tilted, and the cable moves to an original position thereof and thereby the linear locking device is locked when the lever is released.

3. The fold and dive seat of claim 2, wherein the linear locking device comprises:
   an elastic clamp forming a round pipe including an opening at one side of the elastic clamp, and the elastic clamp positioned between an outer circumference of the rail pipe and an inner circumference of the slider; and
   a pulling plate integrally formed in an end of the elastic clamp and extended to an outer circumference of the slider,
   wherein an inner end of the cable is coupled to the pulling plate.

4. The fold and dive seat of claim 3, wherein a stopper is integrally formed on the outer circumference of the slider and configured to define a first position before the pulling plate is pulled and a second position after the pulling plate is pulled.

5. The fold and dive seat of claim 3, wherein a friction plate is provided on an inner circumference of the elastic clamp and configured to come into contact with or move away from the rail pipe.

6. The fold and dive seat of claim 2, wherein a reclining cable connected with a reclining device is connected to the lever to be pulled together.

7. The fold and dive seat of claim 1, wherein the front end of the tilting and dive link is fixed to the seat cushion frame by welding.

8. A fold and dive seat for a vehicle, comprising:
   a seat cushion frame;
   a seatback frame reclinably mounted to the seat cushion frame;
   a tilting and dive link including a front end fixed to the seat cushion frame, and a rear end hinged to a hinge bracket mounted on the seatback frame;
   a link supporter formed on a rear end of the seat cushion frame to support a rear surface of the tilting and dive link;

a rail pipe mounted to a lower portion of the seat cushion frame;

a slider mounted on the rail pipe and configured to be slidable forwards and rearwards; and a tilting support link hinged between a front end of the slider and a front end of the seat cushion frame, wherein a slot is formed on the tilting and dive link and configured to guide a movement trajectory, and a guide pin is formed on a side of the seat cushion frame to be inserted into the slot.

9. The fold and dive seat of claim 8, further comprising:

a lever mounted to a side of the seat cushion frame to be tiltable;

a linear locking device mounted on the slider and configured to lock or unlock the slider to or from the rail pipe; and a cable connected between the lever and the linear locking device, wherein the cable is pulled and thereby the linear locking device is unlocked when the lever is tilted, and the cable moves to an original position thereof and thereby the linear locking device is locked when the lever is released.

10. The fold and dive seat of claim 9, wherein the linear locking device comprises:

an elastic clamp including an opening formed in one side of the elastic clamp, and the elastic clamp positioned between an outer circumference of the rail pipe and an inner circumference of the slider; and a pulling plate integrally formed in an end of the elastic clamp and configured to extend to an outer circumference of the slider, wherein an inner end of the cable is coupled to the pulling plate.

11. The fold and dive seat of claim 10, wherein a stopper is integrally formed on the outer circumference of the slider and configured to define a first position before the pulling plate is pulled and a second position after the pulling plate is pulled.

12. The fold and dive seat of claim 10, wherein a friction plate is provided on an inner circumference of the elastic clamp and configured to come into contact with or move away from the rail pipe.

13. The fold and dive seat of claim 9, wherein a reclining cable connected with a reclining device is connected to the lever to be pulled together.

14. The fold and dive seat of claim 8, wherein the front end of the tilting and dive link is fixed to the seat cushion frame by welding.

* * * * *